No. 646,100. Patented Mar. 27, 1900.
C. B. ROGERS.
THERMOSTAT.
(Application filed Oct. 28, 1899.)

(No Model.)

Witnesses:
Charles B Penrose
Charles H Wheeler

Charles B. Rogers
Inventor
by
Geo. C. Morrison
Attorney

UNITED STATES PATENT OFFICE.

CHARLES B. ROGERS, OF STEVENSON, MARYLAND.

THERMOSTAT.

SPECIFICATION forming part of Letters Patent No. 646,100, dated March 27, 1900.

Application filed October 28, 1899. Serial No. 735,123. (No model.)

*To all whom it may concern:*

Be it known that I, CHARLES B. ROGERS, a citizen of the United States of America, residing at Stevenson, in Baltimore county, in the State of Maryland, have invented certain new and useful Improvements in Thermostats, of which the following is a specification.

This invention relates to that class of thermostats in which a balance tilting thermometer closes an electric circuit by its tilting movement caused by the expansion of the liquid within its tube under the influence of heat and the resulting change in the center of gravity. Although this device is capable of being used to regulate the temperature of an inclosure or to perform any similar function capable of operation by an electric circuit automatically closed by the tilting of the thermometer-tube under the influence of a change in temperature, as described herein, it is more especially adapted to automatically put into operation a signaling device or alarm whenever the temperature of the inclosure wherein it rests is raised above a given point.

The invention consists of an improved thermostat of the character hereinbefore referred to and in details of construction, as hereinafter set forth and claimed.

Figure 1:
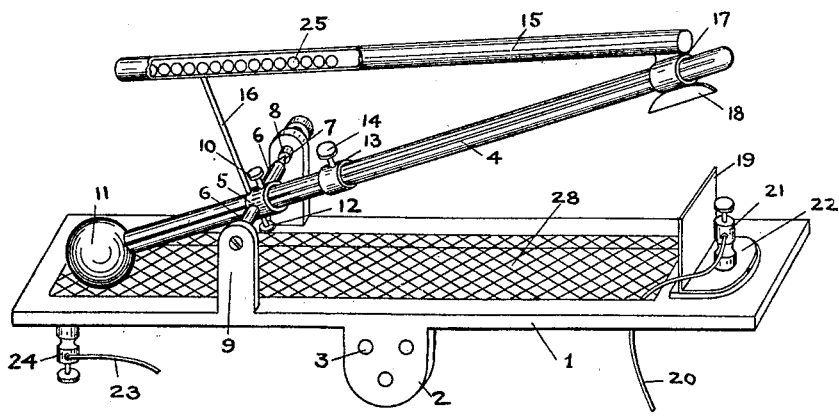
Figure 2:
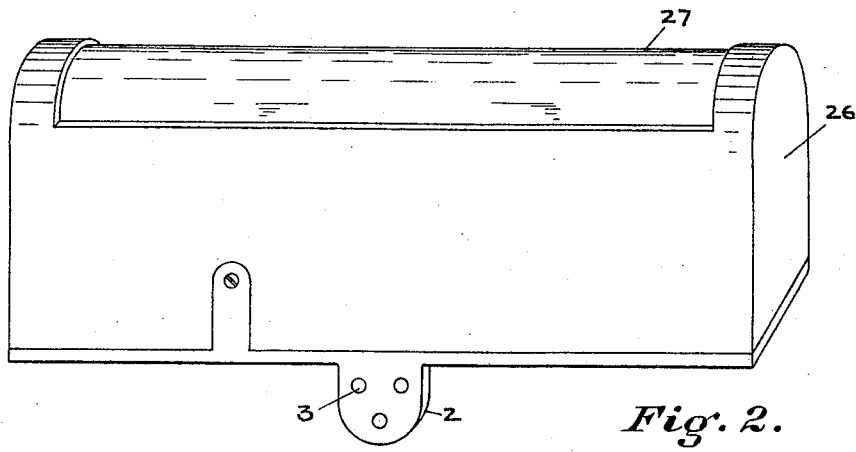

In the accompanying drawings, Figure 1 is a perspective view of a thermostat constructed in accordance with this invention. Fig. 2 is a perspective view of the device inclosed within a suitable cover.

In the construction of this invention a suitable base or support 1 is employed, which may be made of metal or any other suitable material, and, as here shown, consists of an oblong plate or frame provided with a bracket-piece 2, having suitable holes 3 for screwing the plate 1 to any suitable support. A thermometer-tube 4 is mounted in a sleeve 5, having arms 6, which form a shaft with pointed ends 7, resting in supports 8, mounted in the posts or trunnions 9, located on the sides of the plate 1. The thermometer 4 is secured in place by a set-screw 10, clamping the thermometer to the sleeve 5, and may be adjusted to the proper position by loosening the set-screw 10 and moving the thermometer 4 through the sleeve 5 and then tightening the screw 10. The supports 8 for the arms 6 are preferably arranged to form a delicate balance, as shown in the drawings. The normal position of the thermometer 4 is preferably as shown in Fig. 1, with its bulb 11 resting upon or adjacent to the plate 1. In order to assist and obtain a proper balance of the thermometer 4 on its shaft and to raise or lower the center of gravity of the instrument, as may be desired, a weight 12 is suspended from the lower side of the sleeve 5, and, as here shown, is in the form of a thumb-screw engaging the sleeve 5, so that the proper position of the weight 12 may be obtained by securing it in adjusted position on the under side of the sleeve 5.

In order to further assist in the balancing of the thermometer, a sleeve 13 is employed, preferably located and slidable upon the thermometer 4 and held in adjusted position by set-screw 14. By loosening the set-screw 14 and moving the sleeve 13 to any point determined upon the sleeve 13 will assist in tilting the thermometer when a certain degree of heat has been reached on the thermometer-scale by the expansible fluid in the thermometer. While the adjustment of the sleeve 13 determines the degree of heat at which the thermometer shall tilt, the suspended weight 12, heretofore described, acts to compensate for any fault in mechanical construction of the instrument or any error in its adjustment. In lieu of having the sleeve 13 mounted on the thermometer 4 it may be mounted and adjustable on the tube 15 and the latter provided with a graduated scale, which shall indicate the temperature at which the weight of the sleeve, in connection with the expansion of the fluid, will cause the instrument to tilt and close the electric circuit.

In conjunction with the thermometer 4 is employed a suitable device for more firmly closing the electric circuit and also for holding it in closed position after the thermometer has tilted. As here shown the device preferably consists of a tube 15, supported near one end by means of a rod 16, mounted on the sleeve 5, and at its other end by means of a sleeve 17, engaging the end of the thermometer 4 and having a contact 18, which when the thermometer is tilted contacts with a contact-plate 19 and closes an electric circuit (not shown) extending through a wire 20, clamped at one end to the terminal 21, mounted on the plate 22, which supports the plate 19 and is insulated from the plate 1. The other end of the electrical circuit is connected by a wire 23 with terminal 24, mounted on the plate 1. It will readily be seen that when the contact 18 by the tilting of the thermometer 4 contacts with the plate 19 the circuit will be closed through plate 19, terminal 21, wire 23, terminal 24, plate 1, supports 9, shaft 6, sleeve 5, rod 16, and tube 15. In order to hold the contacts 18 and 19 in closed position after the circuit is closed by the tilting of the thermometer, a suitable automatic shifting device is employed, which, as here shown, preferably consists of a number of balls 25, located in the tube 15, normally at one end thereof, and when the thermometer 4 is tilted the tube 15, becoming inclined, the balls 25 roll to the other end of the tube 15 and by their weight hold the contacts 18 and 19 in closed position. In practice the device is constructed so that the contact-plate 19 will not permit the thermometer-tube 4 to descend below a horizontal position in order to prevent the liquid therein from running to the head of the tube. This inclination, owing to the angle which the tube 15, containing the sliding weight 25, bears to the thermometer-tube 4, will be sufficient to cause the sliding weight 25 to automatically move to the contact end of the thermometer-tube 4 and hold the contact-points 18 and 19 firmly together.

In order to protect the thermostat, keep it free from dust, &c., a suitable cover 26 is employed, as shown in Fig. 2, which is placed over the operative parts and rests on the plate 1. The top of the cover may be provided with a glass 27 or any suitable covering, by means of which the movements of the thermostat may be observed, and in order that the heat may reach and effect the thermometer the plate 1 is provided with a netting or gauze 28 or other suitable open-work whereby the heat may have access to the thermometer.

It will thus be seen from the foregoing description that when the temperature of the room in which the thermostat is located has reached a certain point the expansion of the fluid in the thermometer-tube changes the center of gravity of said tube and with the aid of the sleeve 13 mentioned will cause the thermometer to tilt, bringing the contact 18 in contact with the contact 19 and closing the electric circuit, and with the aid of the shifting weights contained in tube 15 keeping said circuit closed, thereby causing any suitable alarm connected with said circuit to be operated by the closing of said circuit.

What I claim is—

1. The combination with an electric circuit of a balance tilting thermometer located in said circuit and adjustable longitudinally in its fulcrum, an adjustable weight depending from the fulcrum of said thermometer to raise and lower the center of gravity thereof, and an electrical contact at the outer end of said thermometer, which, by the tilting of the thermometer caused by the expansion of the fluid therein, closes the electric circuit, as herein set forth.

2. The combination with an electric circuit, of a balance tilting thermometer located in said circuit and adjustable longitudinally in its fulcrum, an adjustable weight depending from the fulcrum of said thermometer to raise and lower the center of gravity thereof, a compensating weight mounted on said thermometer and adjustable longitudinally, and an electrical contact at the outer end of said thermometer, which, by the tilting of the thermometer, caused by the expansion of the fluid therein, closes an electric circuit, as herein set forth.

3. The combination with an electric circuit, of a balance tilting thermometer located in said circuit, and adjustable longitudinally in its fulcrum, an adjustable weight depending from the fulcrum of said thermometer to raise and lower the center of gravity thereof, and an electrical contact at the outer end of said thermometer, which, by the tilting of the thermometer caused by the expansion of the fluid therein, closes the electric circuit, and an automatic shifting weight which holds said contact in closed position, as herein set forth.

4. The combination with an electric circuit of a balance tilting thermometer adjustable longitudinally in its fulcrum and located in said circuit, and having an electric contact at its outer end located in said circuit, a tube mounted on said thermometer and located in said electric circuit, and carrying an automatically-shifting weight which holds said contact in closed position when the thermometer is tilted, said thermometer being provided with a scale and compensating weight mounted upon and adjustable longitudinally on said thermometer, as herein set forth.

In testimony whereof I have signed this specification, in the presence of two witnesses, this 23d day of October, 1899.

CHAS. B. ROGERS.

Witnesses:
CHARLES B. PENROSE,
CHARLES H. MILLIKIN.